United States Patent [19]

Metzger

[11] 3,794,755

[45] Feb. 26, 1974

[54] BLANKING METHOD AND APPARATUS FOR VIDEO FILM RECORDER

[75] Inventor: Lenard M. Metzger, Rochester, N.Y.

[73] Assignee: Eastman Kodak Company, Rochester, N.Y.

[22] Filed: July 3, 1972

[21] Appl. No.: 268,320

[52] U.S. Cl....... 178/5.4 CD, 178/5.2 D, 178/6.7 A

[51] Int. Cl............................................. H04n 9/02

[58] Field of Search..... 178/5.2, 5.4, 5.2 D, 5.4 CD, 178/6.7

[56] References Cited

UNITED STATES PATENTS 3,716,664 2/1973 Dubbe.......................... 178/5.4 CD

*Primary Examiner*—Richard Murray

*Attorney, Agent, or Firm*—W. H. J. Kline et al.

[57] ABSTRACT

Method and apparatus for recording video information derived from composite video field signals including horizontal and vertical synchronizing signals, chrominance signals and luminance signals as color pictorial information in media frames on photosensitive media, such as color motion picture film. The film is continuously advanced through a scanning zone at a predetermined frame rate that is detected to produce a frame rate signal having a frequency equal to the frame rate of the continuously moving film. A flying spot scanner generates a beam of light modulated in intensity by the chrominance and luminance signals in said video information, and the beam is directed along a predetermined path to expose the film frames advanced through the film scanning zone. The modulated beam of radiation as deflected in a video field pattern recurring at a field rate equal to the frequency of the vertical synchronizing signal, and a vertical deflection circuit is responsive to the frame rate signal and the vertical synchronizing signal to superimpose the video fields on the film frames continuously advanced through the film scanning zone. An exposure control circuit including a counter is responsive to the vertical synchronizing signal and the frame rate signal to count the number of vertical synchronizing signals occurring in the period of the frame rate signal to produce an inhibit signal when the counted number exceeds a predetermined number. The inhibit signal inhibits the application of the luminance and chrominance signals to the flying spot scanner to prevent the exposure of the film frame to one or more video fields, the inhibit signal terminating at the instant that a vertical synchronizing signal follows, in time, a frame rate signal.

10 Claims, 5 Drawing Figures

BLANKING METHOD AND APPARATUS FOR VIDEO FILM RECORDER

CROSS REFERENCE TO RELATED APPLICATIONS

Reference is made to commonly assigned copending U.S. Application Ser. No. 268,294 entitled VIDEO RECORDING APPARATUS, filed in my name on even date herewith to U.S. Application Ser. No. 60,493 entitled FILM SCANNING FOR TELEVISION REPRODUCTION, filed in the names of David L. Babcock and Lenard M Metzger on Aug. 3, 1970 and to U.S. Application Ser. No. 189,675 entitled GAIN CONTROL CIRCUIT filed in the names of Carl N. Schauffele and Harry L. Valenta, Jr. on Oct. 15, 1971.

BACKGROUND OF THE INVENTION

Field of the Invention

This invention relates to video recording apparatus, and more particularly to a method and apparatus for recording video information as pictorial information in frames on photosensitive media continuously advanced at a frame rate differing from the rate of recurrence of the video information.

Description of the Prior Art

Video information has been heretofore recorded as pictorial information on recording media such as photographic film through the use of kinescope recorders and electron beam recorders. Kinescope recorders employ special movie cameras having a lens and an intermittent or continuous drive mechanism for photographing scanned patterns or pictures from the face of a kinescope or picture tube of a television receiver. The television receiver responds to the transmitted television receiver to derive composite video field signals including horizontal and vertical synchronizing and blanking signals, a luminance signal and chrominance signals and to transform the video field signals into pictures on the face plates of the kinescope recurring at the standard (in the United States) 60 Hz. frequency of the vertical deflection signal. The movie camera intermittently or continuously advances the motion picture film at a standard film frame rate of 18 or 24 frames per second, and optical or mechanical apparatus is interposed between the face plate of the kinescope and the film gate of the motion picture camera to synchronize the video field rate to the intermittent or continuous frame rate of movement of the motion picture film. U.S. Pat. Nos. 2,622,147 and 3,014,090 are illustrative of such kinescope recorders. Both black and white and color pictures displayed on black and white or color kinescopes may be recorded on the correspondingly sensitive motion picture film.

In electron beam recording, the glass face plate of the kinescope, its associated phosphorus screen and the camera lens are eliminated by bringing the electron sensitive media, such as photographic film, inside the vacuum chamber of the tube. Such known electron beam recorders provide increased resolution of pictures recorded on the electron sensitive media but are limited to black and white or color-coded, black and white recording. An electron beam recorder of this type is disclosed in U.S. Pat. No. 3,444,317 wherein motion picture film intermittently advanced at 24 frames per second is exposed to an electron beam modulated by a video field signal recurring at 60 fields per second, and synchronization apparatus is proposed for synchronizing the 24 frames per second intermittent rate of advancement to the 60 fields per second video signal. Another electron beam recorder is disclosed in the publication entitled EVR: MOVIES AND MICROFILM ON THE TV SCREEN by L. Andrew Mannheim, published in *Technical Photography* On Sept. 23, 1969 wherein a special film is continuously advanced at 30 frames per second during recording.

The disparity between the standard film frame rates and the 60 Hz. television field rates causes problems in positioning the video field raster pattern on successive film frames in synchronism with the rate of film movement and in the equalization of the number of exposures of each film frame to the successive video field scanning patterns. In kinescope recorders of the type hereinbefore described, the optical or mechanical apparatus interposed between the face plate of the kinescope and film gate of the motion picture camera may include a shutter element for preventing the exposure of the film frames to one or more video fields during the intermittent pulldown phase of the film advance mechanism. In electron beam recording of the type disclosed in the aforementioned U.S. Pat. No. 3,444,317, a video field time interval is blanked during the intermittent period of advancement of the motion picture film. The aforementioned EVR electron beam recorder operates continuously at 30 frames per second and does not require a complex synchronizing method or blanking mechanism during recording or playback. However, the special EVR film cannot be projected in a conventional film projector for viewing on a large screen. Because of the complexity and expense of kinescope and electron beam recorders that are capable of achieving satisfactory results, such recorders are generally restricted in use to professional film producing and television studios.

In the aforementioned, commonly assigned, copending Application Ser. No. 60,493, there is disclosed a method and apparatus for scanning conventional color motion picture film and deriving video signals representative of the pictorial information on the film for application to a home television receiver, whereby the pictorial information may be viewed in color on the receiver screen. This apparatus includes a black and white flying spot scanner for scanning the image frames of the motion picture film with a scanning beam of white light, means for moving the motion picture film continuously through a film scanning zone at the standard film rate of the film, such as 18 or 24 frames per second, optical-to-electrical signal transducer apparatus responsive to the scanning beam of light transmitted through the image frames on the film and modulated in intensity and color by the image frames for producing the chrominance and luminance electrical signals of each video field signal, and synchronizing means responsive to the detected rate of movement of the film and the standard 60 Hz. vertical synchronizing signal for synchronizing the vertical deflection of the raster pattern generated by the flying spot scanner to the instantaneous position and velocity of image frames moving through the film scanning zone. This apparatus may be incorporated in a teleplayer adapted to receive either amateur or professional, cartridge or open reel, motion picture film of such a price and quality as to be attractive for sale in the commercial and the home entertainment market. Applicant has recognized that such a film teleplayer may be simply and inexpensively adapted to a television receiver to receive televised video information and record the video information on photosensitive photographic film continuously driven through the same film scanning zone.

BRIEF SUMMARY OF THE INVENTION

Accordingly, it is an object of this invention to provide an improved method and apparatus for recording video information on photosensitive media.

It is also an object of this invention to provide an improved method and apparatus for receiving and recording televised video information recurring at a predetermined number of video fields per unit time as pictorial information on media frames of photosensitive media continuously moving at a predetermined number of media frames per unit time.

It is a further object of the invention to provide an improved method and apparatus for receiving televised video information recurring at a predetermined number of video fields per unit time, recording the video information as pictorial information on media frames of photosensitive media continuously moving at a predetermined number of media frames per unit time differing from the predetermined number of video fields per unit time and equalizing the numbr of video fields recorded in each media frame.

Another object of this invention is to provide an improved video recording method and apparatus which provides synchronized frame conversion between the continuous rate of movement of photosensitive media and the rate of recurrence of video information.

In accordance with these and other objects of the invention, improved video recording apparatus and method are disclosed for recording video information recurring at a predetermined number of video fields per unit time as pictorial information in media frames on photosensitive media continuously advanced through a media scanning zone at a predetermined number of media frames per unit time differing from the predetermined number of video fields per unit time. A beam of radiation modulated in intensity by the video information is directed by scanning means along a predetermined path to expose said media frames advanced through said media scanning zone and is scanned in a video field pattern recurring at said predetermined number of video fields per unit time. Synchronizing means is responsive to the predetermined number of video fields and media frames per unit time to produce a deflecting signal which is applied to scanning means to superimpose each video field recurring at the predetermined number of video fields per unit time on a media frame continuously advanced through said media scanning zone, and exposure control means maintains the video field patterns superimposed on each media frame equal in number. In a preferred embodiment of the invention, the predetermined number of media frames per unit time advanced through said media scanning zone is detected to produce a frame rate signal. The equal exposure of each media frame is accomplished by counting and maintaining a count of the number of video field patterns superimposed on each media frame and resetting the count to zero at each occurrence of a frame rate signal, producing an inhibit signal when the count exceeds a predetermined number of video fields superimposed on each media frame, and inhibiting the operation of the scanning means in response to the video information for the duration of the inhibit signal, until the inhibit signal is terminated at the instant a video field immediately follows, in time, the occurrence of the frame rate signal that resets the count to zero. In a further preferred embodiment of the invention, the circuit means is responsive to the frame rate signal to produce a vertical scan modification signal representative of the instantaneous positions in the media scanning zone of successive media frames, and the vertical scan modification signal is combined with a vertical deflection signal to position the video field developed by horizontal and vertical synchronizing signals in the video information on the media frames continuously moving through the media scanning zone.

Other objects and advantages of the invention will become apparent from the following detailed description taken in connection with the accompanying drawings.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

As stated hereinbefore, commonly assigned, copending U.S. Application Ser. No. 60,493 discloses a method and apparatus for scanning conventional color motion picture film and deriving video signals representative of the pictorial information on the film for application to a home television receiver. Many of the elements shown within the broken line 10 of FIG. 1 and the entire vertical deflection circuit shown in FIG. 2 correspond to elements previously described in detail in U.S. Application Ser. No. 60,493. These common elements are advantageously employed in the video recording apparatus of the present invention for recording video information as color pictorial information in frames on conventional color motion picture film having perforations or indicia disposed along the film that are normally used in a motion picture camera to intermittently position successive frame areas of the film in the film gate of the camera. Therefore, the frames of conventional motion picture film are referenced to particular indicia or perforations during conventional exposure of the film.

Figure 1:
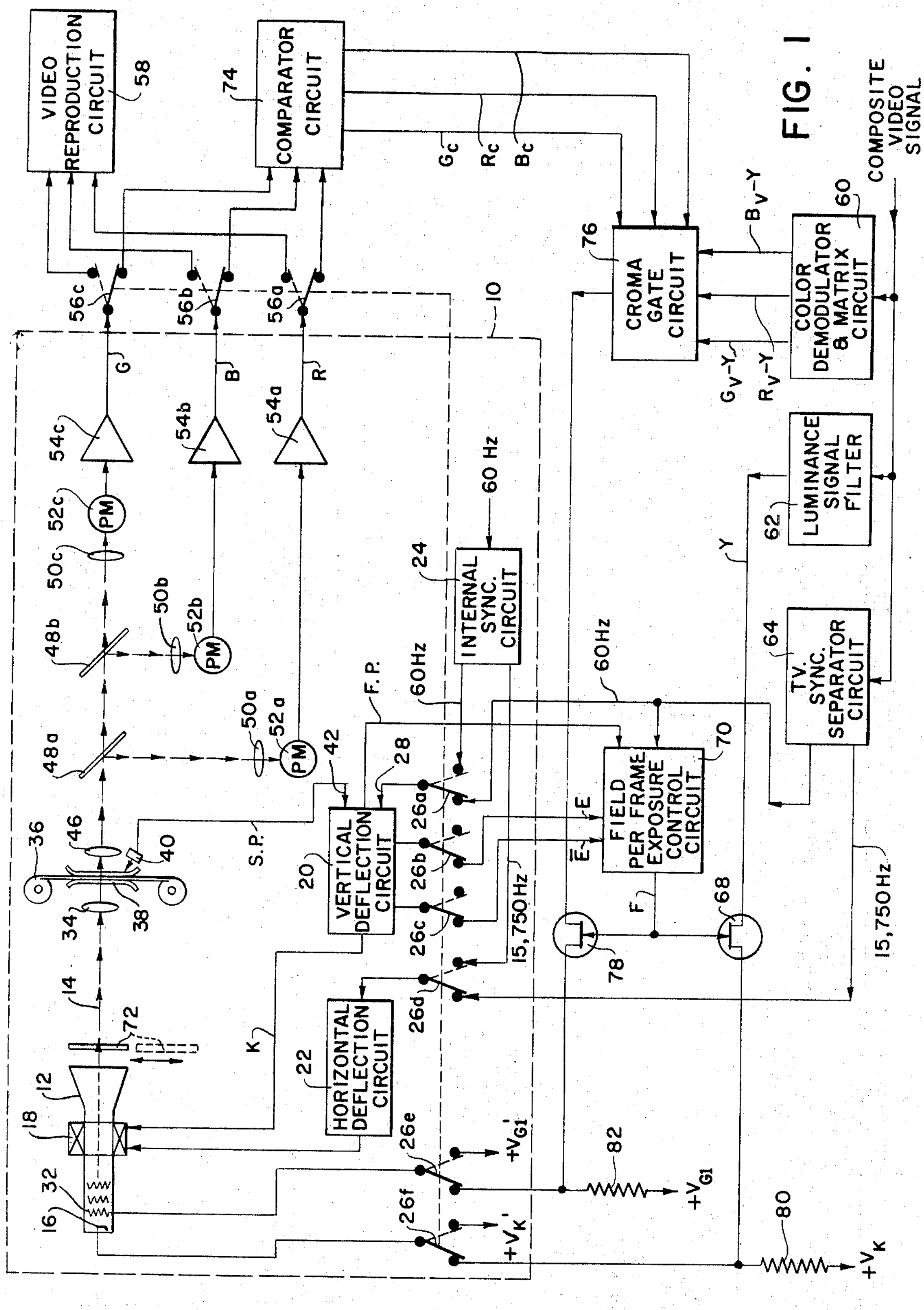
FIG. 1 is a circuit diagram of an illustrative embodiment of the video recording apparatus including a field per frame exposure control circuit of the present invention.

The common elements of the circuit diagram of FIG. 1 comprise a flying spot scanner 12 for producing a scanning beam 14 when the electrons emitted by the cathode 16 strike the face plate of the flying spot scanner 12. The scanning beam 14 is deflected vertically and horizontally over the face plate of the flying spot scanner 12 by the magnetic field induced in the vertical and horizontal deflection yoke 18 in response to the corresponding vertical deflection signal M and a horizontal deflection signal developed by the vertical and horizontal deflection circuits, 20 and 22. An internal sync generator 24 responds to a 60 Hz. a.c. line signal to produce a 60 Hz. (59.97 Hz. for color) vertical sync signal for application via switch 26*a* to a first input terminal 28 of the vertical deflection circuit 20 and a 15,750 Hz. horizontal sync signal for application via switch 26*d* to the input terminal of horizontal deflection circuit 22. The scanning beam 14 is deflected in the horizontal direction, that is, transversely to the direction of film advance, under control of the horizontal deflection circuit 22, 262½ times during each video field, which corresponds in time duration to the period of the 60 Hz. vertical sync signal. During video reproduction, the switches 26*e* and 26*f* connect the constant voltage signal $+V_{g1}'$ and $+V_k'$, respectively, to the grid 32 and cathode 16, respectively, of the flying spot scanner 12 to maintain the intensity of the scanning beam 14 constant.

The constant intensity scanning beam 14 is imaged by lens 34 upon image frames on the media 36, comprising motion picture film, continuously advanced through a film scanning zone 38 defined by a film gate having an aperture equal to twice the distance between successive perforations in the film. The aforementioned film drive perforations are sensed by an indicia or perforation sensor 40 that produces a frame rate signal SP having a frequency equal to the frame rate of movement of the film 36, which is normally either 18 or 24 frames per second. The frame rate signal is applied to a second input terminal 42 of the vertical deflection circuit 20.

The scanning beam 14 transmitted through the image frames on the motion picture film 36 is modulated in color and intensity by the color pictorial information in the image frames, and the modulated beam is imaged by lens 46, dichroic filter 48*a* and 48*b* and lenses 50*a*, 50*b* and 50*c* upon photosensitive devices 52*a*, 52*b* and 52*c* respectively. The dichroic filter 48*a* is operative to reflect red light upon the photosensitive device 52*a* and transmit blue and green light to the dichroic filter 48*b* which reflects blue light to the photosensitive device 52*b* and transmits green light to the photosensitive device 52*c*. The photosensitive devices 52*a*–52*c* transform the received colors of light into red, blue and green color signals R, B and G which are amplified by amplifiers 54*a*–54*c* and applied by switches 56*a*–56*c* (when the switches 26*a*–26*e* and 56*a*–56*c* are located in the dashed line positions) to the video reproduction circuits 58 of a color television transmitter or receiver.

An audio transducer (not shown) may also be provided to pick up the sound track on the motion picture film 36 and apply an audio signal to the television receiver to reproduce the sound track in synchronism with the reproduction of the image frames. The red, blue and green color signals, the 60 Hz. vertical sync signal, the 15,750 Hz. horizontal sync signal and the audio signal may also be applied to video encoding circuits (not shown) of the video reproduction apparatus for producing composite video field signals for direct application to the antenna terminal of the television receiver or transmission of the composite video field signal to a remote receiver. Alternatively, these signals may be applied directly to the appropriate television display circuits through switching apparatus in a manner shown, for example, in U.S. Pat. No. 3,553,352 entitled PHOTOGRAPHIC FILM AND TELEVISION SIGNAL REPRODUCTION APPARATUS.

The remaining elements of the circuit of FIG. 1 comprise, in combination with the common elements described heretofore, the video recording apparatus of my invention. A composite video signal is received by a television receiver from a remote transmitting station and is applied to the depicted color demodulator and matrix circuit 60, the luminance signal filter 62 and the TV sync separator circuit 64 which may comprise elements of the television receiver and are well known in the prior art. The color demodulator and matrix circuit 60 operates in a manner well known in the prior art to separate from the composite video field signals the red, blue, and green chrominance or color difference signals $R_v - Y$, $B_v - Y$ and $G_v - Y$, respectively, that are applied to the chrominance gate circuit 66. The luminance signal filter 62 responds to the composite video field signals to produce a high resolution luminance signal Y that is applied to the source terminal of normally conductive FET switch 68. The TV sync separator circuit 64 responds to the composite video field signal to detect the 60 Hz. vertical sync and blanking signals and the 15,750 Hz. horizontal sync and blanking signals. In as much as switches 26*a* and 26*d* are connected as shown in FIG. 1, the 60 Hz. vertical sync signal is applied to the first input terminal 28 of vertical deflection circuit 20, and the 15,750 Hz. horizontal sync signal is applied to the horizontal deflection circuit 22. The vertical sync signal is also applied to an input terminal of a field-per-frame exposure control circuit 70.

As in the video reproduction apparatus described hereinbefore, it is necessary to synchronize the vertical deflection of the scanning beam 14 in response to the frame rate signal and in response to the 60 Hz. vertical sync signal decoded from the composite video field signal received by the television receiver. Moreover, in color video recording, it is necessary to impart color and intensity modulation of the scanning beam 14 in direct response to the chrominance signals decoded from the composite video field signal, and it is necessary to maintain the successive exposures of each media frame of the film 36 equal in number so that the media frames are uniformly exposed.

The color and intensity modulation of the beam 14 is described in greater detail in the aforementioned U.S. Application Ser. No. 268,294. In brief, an optical filter 72 comprising a repetitive pattern of red, blue and green color filter strips transmissive of the corresponding colors of light is disposed in the path of the scanning beam 14. The switches 56*a*–56*c* are moved to the solid line position shown in FIG. 1, and the red, blue and green signals developed as the scanning beam 14 traverses the corresponding red, blue and green filter stripes are applied to a comparator circuit 74. Comparator circuit 74 produces a red, blue or green color control signal when the corresponding one of the color signals is greater than the remaining color signals, and the color control signal is applied to a chrominance gate circuit 76. The chrominance gate circuit 76 passes one of the corresponding chrominance signals $R_v - Y$, $B_v$ $-Y$ or $G_v - Y$ in response to the corresonding color control signals $R_c$, $B_c$ or $G_c$ to the source terminal of FET switch 78. Since the FET switches 68 and 78 are normally rendered conductive by the high signal level of the exposure control signal F, the luminance signal Y and the selected chrominance signal are conducted to the cathode 16 and grid 32 of the flying spot scanner 12 through switches **26*f* and 26*e*. A constant voltage signal $+V_k$ is added to the luminance signal Y through resistor 80 and a constant voltage signal $+V_{g1}$ is added to the chrominance signal through resistor 82. In the flying spot scanner 12, the luminance signal Y applied to the cathode 16 is effectively subtracted from the chrominance difference signal applied to the grid 32, and the intensity of the scanning beam 14** is thus modulated by the relative amplitudes of the two signals.

The synchronization of the vertical deflection of scanning beam 14 in response to the frame rate signal and in response to the 60 Hz. vertical sync signal is accomplished by the vertical deflection circuit 20 shown more particularly in FIG. 2 described hereinafter with respect to the wave forms of FIG. 3. Tied into the requirements of synchronizing the video field rate to the frame rate of movement of film is the requirement that the film frames be exposed to an equal number of video fields. The field-per-frame exposure control circuit 70 of the present invention is shown in first and second embodiments in FIGS. 4 and 5, respectively, explained hereinafter with respect to FIG. 3. For the purpose of this description, it will be understood that the film frame rate is taken to be 24 frames per second, and the video field rate is assumed to be 60 fields per second.

Figure 2:
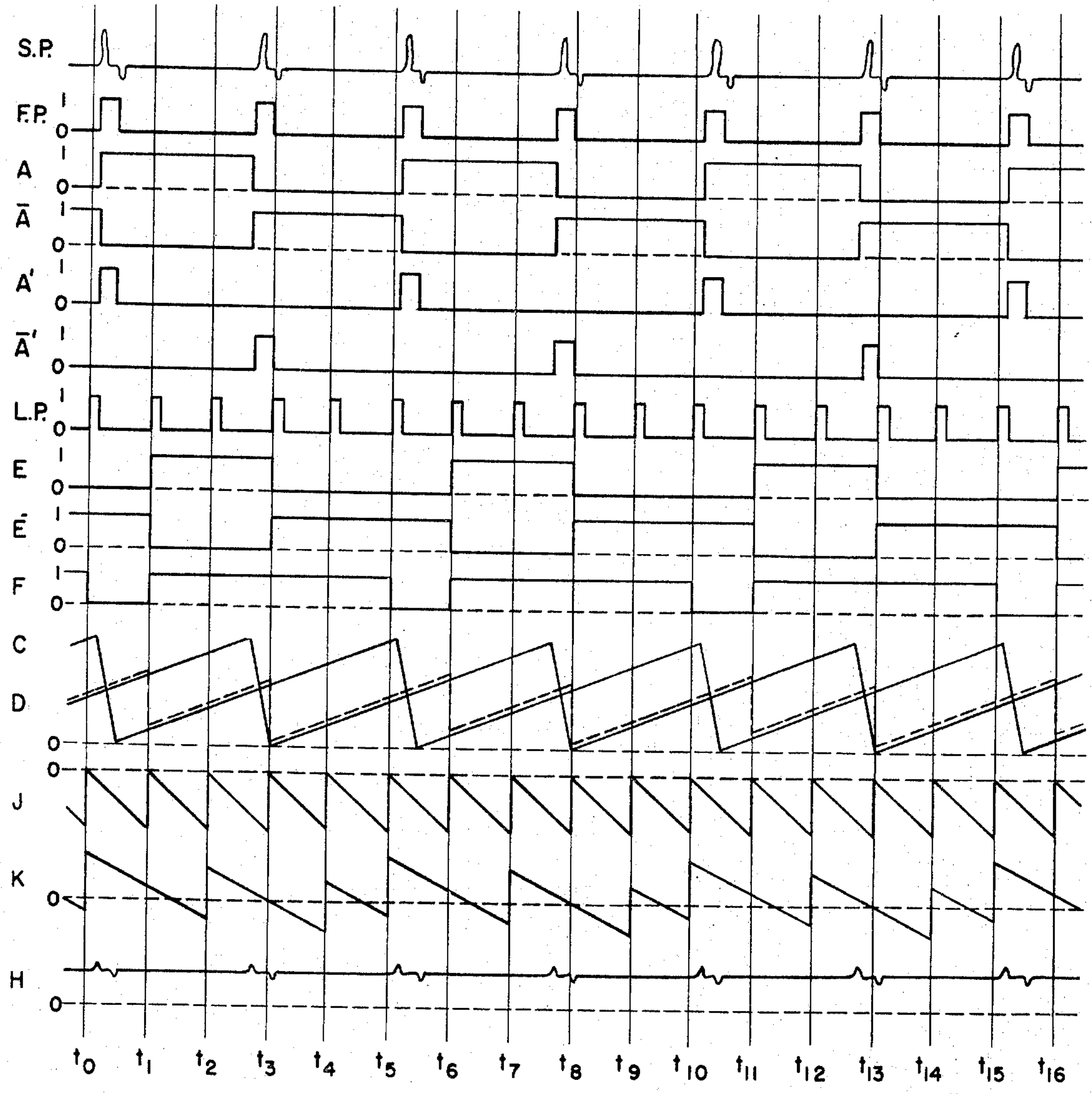
FIG. 2 is a circuit diagram of a vertical deflection circuit employed in the video recording apparatus of FIG. 1.

Turning now to FIG. 2, the vertical deflection circuit depicted is responsive to the frame rate signal SP developed by the perforation sensor 40 to produce first and second, 180° out-of-phase, double ramp signals C and D respectively, that each represent the instantaneous position and the velocity of first and second frames or frame areas corresponding to perforations in the film 36 moving through the film scanning zone 38. Alternate portions of the first and second double ramp signals C and D are selected and added to the standard 60 Hz. vertical deflection signal J to produce the composite vertical deflection signal M. At 24 frames per second, the successive first and second film frames are scanned twice and three times, respectively, under the control of the composite vertical deflection signal M. Therefore, it is necessary, to limit the exposure of each film frame to two video fields per frame at 24 frames per second during video recording.

Figure 3:
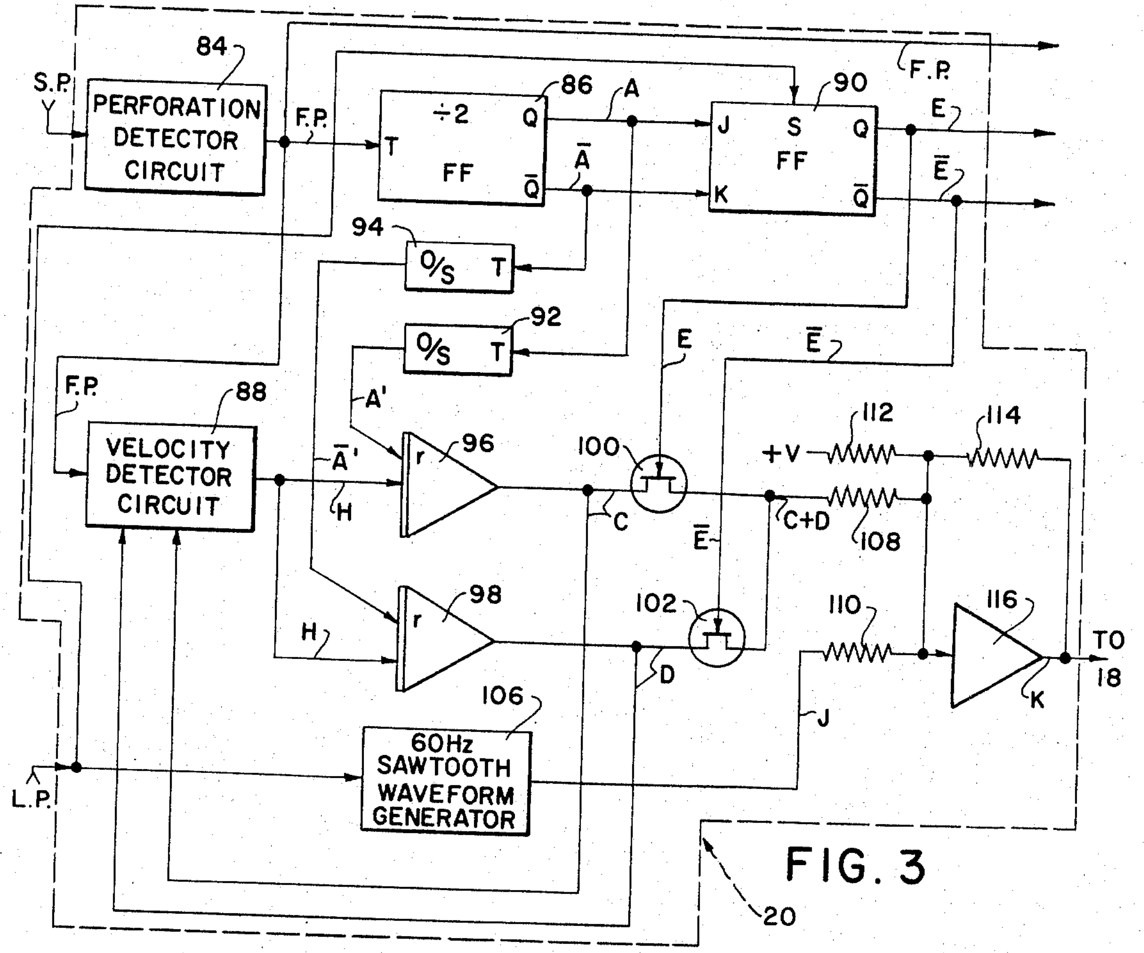
FIG. 3 is a wave form diagram depicting various signals developed at several points in the circuit diagrams of FIGS. 1 and 2.

More particularly, the frame rate signal SP is applied to the perforation detector circuit 84 which produces the squared pulses of the frame rate signal FP shown in FIG. 3. The frame rate signal FP is applied to the input terminal of a ÷ 2 flip flop 86 and to the input terminal of the velocity detector circuit 88. The ÷ 2 flip flop 86 produces the first and second complementary half-frame rate frequency signal A and $\bar{A}$ that are applied to the J and K input terminals of the JK flip flop 90 and to the T input terminals of the one shot circuits 92 and 94. The one shot circuits 92 and 94 respond to the leading edge of the half-frame rate frequency signals A and $\bar{A}$, respectively, to produce the 12 Hz., 180° out-of-phase, reset signals A' and $\bar{A}'$ that are applied to the reset terminals of the double ramp integrators 96 and 98, respectively, that receive the velocity signal H developed by velocity detector circuit 88. The integrators 96 and 98 integrate the signal level of the velocity signal H over the periods of the 12 Hz. reset signals A' and $\bar{A}'$ to produce the first and second double ramp signals C and D. Thus the first and second double ramp signals C and D represent the position of alternately detected frames (represented by the detected perforations) of the film 36 continuously advanced through the film scanning zone 38.

The velocity detector 88 operates in a manner described in greater detail in the aforementioned U.S. Application Ser. No. 189,675 to sample the instantaneous amplitudes of the first and second double ramp signals C and D at time intervals determined by the frame rate signal FP and to compare the sampled amplitudes of the double ramp signals C and D with respect to a constant amplitude level of a reference signal to produce the velocity signal H.

As shown in FIG. 3, each positive impulse of the 60 Hz. signal LP that is applied to the clock C input terminal of the JK flip flop 90 simultaneously with, or immediately succeeding in time, the application of a positive going pulse of the first or second half-frame rate frequency signal A or $\bar{A}$ switches the logic levels of the Q and $\bar{Q}$ output terminals of the JK flip flop 90. The switching signals E and $\bar{E}$ have amplitudes corresponding to the logic levels of the output terminals Q and $\bar{Q}$, respectively, and have periods that are integral multiples of the period of the 60 Hz. signal LP. The signals E and $\bar{E}$ are applied to the gate inputs of FET switches 100 and 102 respectively, that are alternately rendered conductive during the alternate positive levels of the switching signals E and $\bar{E}$. When the switching gates 100 and 102 are rendered conductive, they produce the combined vertical scan modification signal C + D at the common terminal 104.

The 60 Hz. vertical sync signal LP is also applied to the 60 Hz. sawtooth wave form generator 106 to produce the vertical deflection circuit J shown in FIG. 3. It will be noted that the polarities of the double ramp signals C and D and the vertical deflection signal J are opposite since the vertical deflection of the scanning beam 14 is opposite to the direction of movement of the film 36. The vertical scan modification signal C + D is added with the vertical deflection signal J and an offset voltage + V in a summing amplifier comprising the resistors 108, 110, 112, 114 and the operational amplifier 116. The resultant composite vertical deflection signal M developed at the output terminal of operational amplifier 116 is applied to the vertical deflection yoke of the flying spot scanner 12 to control the vertical deflection of the scanning beam during video film recording and reproduction.

As can be seen in FIG. 3, successive film frames are scanned twice and three times under the control of the JK flip flop 90 so that five scanning fields may be superimposed upon two image frames. Mathematically, this result may be verified by dividing the 60 Hz. field rate and the 24 Hz. frame rate by their highest common integral divisor which is, in this instance, 12. At 18 frames per second, the highest common integral divisor is 6 and 60/6 or 10 video fields must be superimposed on 18/6 or 3 succeeding media frames. At 18 frames per second (through the operation of the vertical deflection circuit 20) the first image frame may be scanned three times, the second image frame may be scanned three times and the third image frame may be scanned four times to result in the total number of ten video field scans of the three succeeding image frames. During video reproduction of the film 36, it is acceptable to scan successive film frames an unequal number of times to produce the requisite number of video field signals. However, during recording, such unequal scanning would result in unacceptable variations in the densities of successive film frames.

Figure 4:
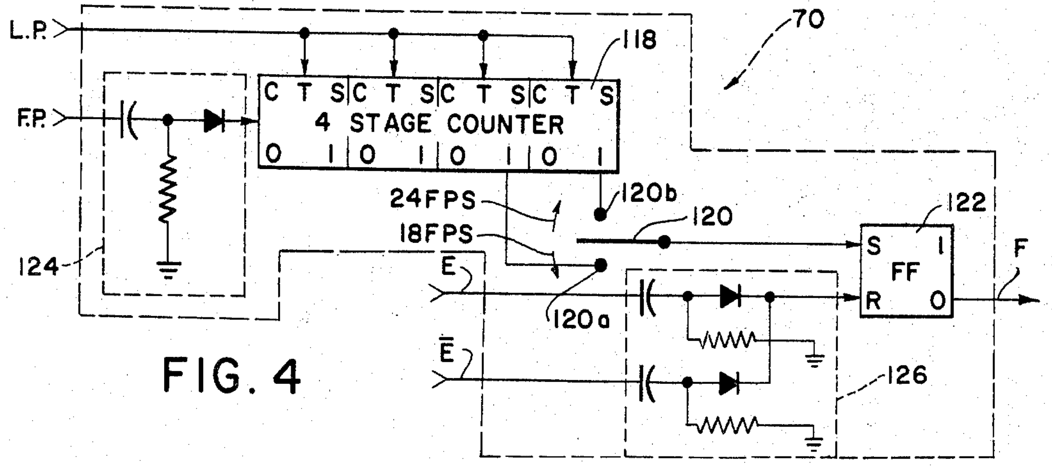
FIG. 4 is a circuit diagram of one preferred embodiment of the field per frame exposure control circuit of FIG. 1.
Figure 5:
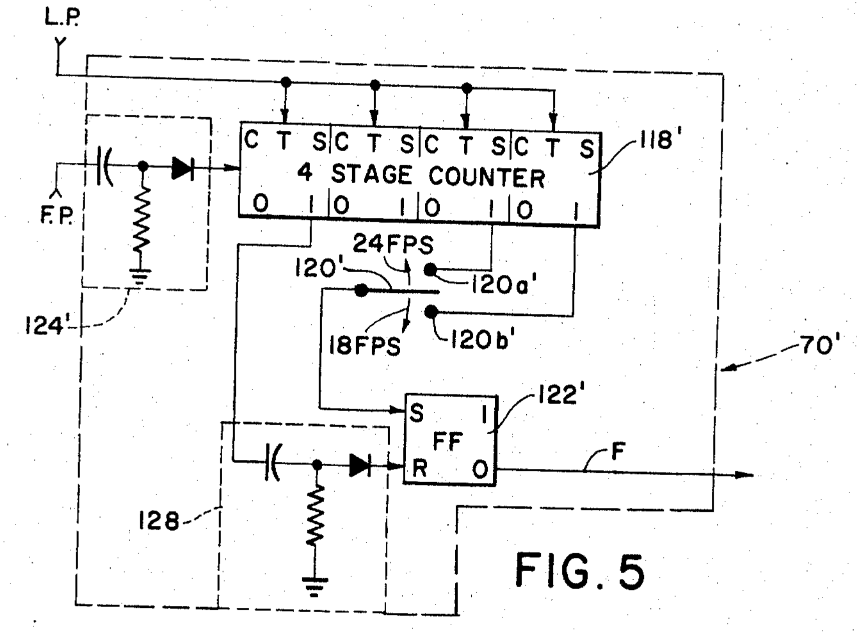
FIG. 5 is a circuit diagram of a further preferred embodiment of the field per frame exposure control circuit of FIG. 1.

In order to prevent this from happening, applicant has provided the field per frame exposure control circuit 70 of the present invention shown in first and second preferred embodiments in FIGS. 4 and 5 for equalizing the exposures of the film frames to the video field. The field-per-frame exposure control circuit 70 produces the exposure control signal F that, as shown in FIG. 3, normally has a positive voltage level that is applied to the gate terminals of FET switches 68 and 78 to render the respective switches conductive to the luminance signal Y and the selected chrominance signal.

Referring now to FIG. 4, one preferred embodiment of the field-per-frame exposure control circuit 70 is shown, and it comprises a four stage counter 118, a dual position switch 120, an RS flip flop 122, a differentiator circuit 124 and a differentiating OR gate 126. The four stage counter 118 may be of any known type having a reset terminal or terminals RS and trigger terminals T that is operative to count the number of positive-going input pulses applied to the trigger terminals T in the period between reset pulses applied to the RS terminal and to produce a positive voltage signal representative of the stored count. In this invention, the four stage counter 118 is operative to count the number of vertical sync pulses LP applied to the T input terminals of each stage of the counter in each period between the pulses of the frame rate signal FP applied through a differentiator 124 to the RS terminal.

The switch 120 is closed on the contact 120*a* when the film frame rate is 24 frames per second to connect the "1" output terminal of the third stage of the four stage counter to the S input of RS flip flop 122 and is closed on the contact 120*b* when the film frame rate is 18 frames per second to connect the "1" output terminal of the fourth stage of counter 118 to the S input terminal of the RS flip flop 122. The switching signals E and $\bar{E}$ are applied to the field per frame exposure control 70 through the operation of the switches 26*b* and 26*c* closed in the solid line position depicted in FIG. 1 and are added together through the differentiating OR gate 126 and applied to the R input terminal of RS flip flop 122. The differentiators of the circuits 124 and 126 insure that the positive going transitions of the corresponding signals are applied to the respective input terminals of the counter 118 and RS flip flop 122 to avoid ambiguity in the operation of the circuit when the vertical sync signal LP approaches coincidence with the pulses of the frame rate signal FP.

Referring now to FIG. 3, at each occurrence of a pulse of the frame rate signal FP, the "1" output terminals of the stages of the four stage counter 118 are reset to zero signal level. The next succeeding pulse of the vertical sync signal LP is counted by the four stage counter to produce a positive signal at the "1" output terminal of the first stage of the counter 118. Simultaneously with the occurrence of the first pulse of the vertical sync signal LP to follow a pulse of the frame rate signal FP, either the signal E or $\bar{E}$ is switched to the positive signal level through the operation of the JK flip flop 90 as described hereinbefore. The signal E or $\bar{E}$, as the case may be, is differentiated and applied to the R input terminal of flip flop 122. Assuming that the "0" output of the flip flop 122 was previously at the high logic level, the signal F will remain positive, as shown, for example, at time $t_3$.

At 24 frames per second, the switch 120 is closed upon the switch contact 120*a*, and the exposure control signal F remains positive so long as the count stored in the counter 118 remains less than 3. Referring to FIG. 3 at time $t_3$, the first pulse of the vertical sync signal LP is counted in the first stage of counter 118; at time $t_4$, the second pulse is counted in the second stage of the counter 118; and at time $t_5$ the third pulse is counted in the third stage of the counter 118. A pulse of the frame rate signal FP immediately follows the storage of the third pulse in the third stage of the counter 118, and the pulse of the frame rate signal FP resets the counter stages to zero. However, at time $t_5$, the "1" output of the third stage of the counter 118 is rendered positive, and the positive signal level is applied through switch 120 to the S input terminal of RS flip flop 122 which responds thereto to switch the "0" output terminal to the low or zero signal level. The positive signal level of the exposure control signal F is restored at time $t_6$ on the next occurrence of the positive going transition of the switching signal E. Therefore, during the interval from $t_5$ to $t_6$, the exposure control signal F has an amplitude insufficient to render the FET gates 68 and 78 in FIG. 1 conductive. The time period between $t_5$ and $t_6$ also corresponds to the third video field scanning period of one frame of the motion picture film moving through the film scanning zone as shown by the vertical scan modification signal C + D in FIG. 3. In FIG. 1, the signals + $V_{g1}$ and + $V_k$ when subtracted in the flying spot scanner 12 are insufficient to produce a scanning beam of light 14. Therefore, during the period $t_5$ to $t_6$ the flying spot scanner 12 is blanked and the composite video signal occurring during this time interval is not recorded on the film 36.

At 18 frames per second, the switch 120 is closed upon the switch contact 120*b*, and the field per frame exposure control circuit 70 operates in the manner described to insure that the film frames are each exposed to three video fields.

Referring now to FIG. 5 there is shown a second preferred embodiment of the field per frame exposure control circuit 70 which also includes a four stage counter 118', switch 120', RS flip flop 122', a first differentiator 124' and a second differentiator 128. The switching signals E and $\bar{E}$ are not employed in the circuit of FIG. 5; rather the "1" output terminal of the first stage of the four stage counter 118' is connected through differentiator 128 to the R input terminal of RS flip flop 122'. In the circuit of FIG. 5, the first pulse of the 60 Hz. vertical deflection signal immediately following, in time, a pulse of the frame rate signal FP is counted and stored in the first stage of the counter 118' rendering the signal level at the "1" output terminal thereof relatively positive. The stored positive signal level at the "1" output terminal of the first stage of counter 118' is applied through differentiator 128 to the R input of flip flop 122 to render positive the signal level of the exposure control signal F. In the same manner as described with respect to FIG. 4, the switch 120' is closed upon the switch contact 120*a'* when the film frame rate is 24 frames per second, and a count of three pulses of the vertical sync signal LP switches the logic levels of the "1" and "0" output terminals of the RS flip flop 122'. Thus, at time $t_5$, the signal level of the exposure control signal F is reduced to zero until time $t_6$, and each frame of the film 36 is exposed to only two video fields. At 18 frames per second the switch 120' is closed upon the switch contact 120b' to connect the "1" output terminal of the fourth stage of counter 118' to the S input terminal of the RS flip flop 122' to insure that each film frame is exposed to no more than three video fields.

Although the invention has been described with respect to particular film frame rates of 18 and 24 frames per second, the vertical deflection circuit 20 will theoretically accommodate any frame rate from zero to 60 frames per second. Also, the field per frame exposure control circuits of FIGS. 4 and 5 will accommodate any frame rate between 10 and 30 frames per second. To accommodate any frame rate between 10 and 20 frames per second, the switch 120 may be closed upon the switch contact 120b to insure that all film frames are exposed to no more than three video fields. To accommodate any frame rate between 21 and 30 frames per second, the switch 120 is closed upon the switch contact 120a to insure that all film frames are exposed to two video fields. Because successive video fields comprise odd and even numbered interlaced scanning raster patterns, it may be desirable to limit total exposure of each film frame to two successive video fields, in which instance, it may be desirable to eliminate the switch 120 and the fourth stage of the counter 118 and directly connect the "1" output terminal of the third stage of the counter 118 to the S input terminal of the RS flip flop 122.

In summary, an improved method and apparatus has been disclosed for recording video information in media frames on photosensitive media, such as motion picture film, wherein the media is continuously advanced through a media scanning zone, the rate of advancement of the media is detected to produce a frame rate signal, the media frames are scanned in a video field produced under the control of the composite video field signal to be recorded and the frame rate signal, and an equal number of successive video fields are superimposed on each media frame of the continuously moving photosensitive media.

The invention has been described in detail with particular reference to preferred embodiments thereof, but it will be understood that variations and modifications can be effected within the spirit and scope of the invention.

I claim:

1. Video recording apparatus for recording video information recurring at a predetermined number of video fields per unit time as pictorial information in media frames on photosensitive media continuously advanced through a media scanning zone at a predetermined mumber of media frames per unit time differing from the predetermined number of video fields per unit time, said apparatus comprising:

a. synchronizing means responsive to the predetermined number of media frames per unit time advanced through said media scanning zone and the predetermined number of video fields per unit time for producing a deflecting signal representative of the instantaneous position of the media frames on said photosensitive media continuously advanced through said media scanning zone;

b. scanning means responsive to said video information for generating a beam of radiation modulated in intensity by said video information and for scanning said modulated beam of radiation in video field patterns of radiation recurring at said predetermined number of video fields per unit time and responsive to the deflecting signal for deflecting the video field patterns of radiation in synchronism with the media frames on said photosensitive media continuously advanced through said media scanning zone to superimpose each video field pattern on a media frame;

c. exposure control means responsive to the predetermined number of media frames per unit time advanced through said media scanning zone and the predetermined number of video fields per unit time for maintaining the video field patterns superimposed on each media frame equal in number;

d. counter means for counting and maintaining a count of the number of video fields;

e. means responsive to the advancement of each media frame into said media scanning zone for resetting the count maintained in said counter means to zero;

f. means for comparing the count maintained in said counter means to a predetermined number and for producing an inhibit signal when the count exceeds the predetermined number; and g. inhibit means responsive to the inhibit signal for inhibiting the operation of said scanning means in response to said video information until said scanning means superimposes a video field pattern on a succeeding media frame in response to the deflecting signal.

2. Video recording apparatus for recording video information recurring at a predetermined number of video fields per unit time as pictorial information in media frames on photosensitive media continuously advanced through a media scanning zone at a predetermined number of media frames per unit time differing from the predetermined number of video fields per unit time, said apparatus comprising:

a. synchronizing means responsive to the predetermined number of media frames per unit time advanced through said media scanning zone and the predetermined number of video fields per unit time for producing a deflecting signal representative of the instantaneous position of the media frames on said photosensitive media continuously advanced through said media scanning zone;

b. scanning means responsive to said video information for generating a beam of radiation modulated in intensity by said video information and for scanning said modulated beam of radiation in video field patterns of radiation recurring at said predetermined number of video fields per unit time and responsive to the deflecting signal for deflecting the video field pattern of radiation in synchronism with the media frames on said photosensitive media continuously advanced through said media scanning zone to superimpose each video field pattern on a predetermined media frame;

c. exposure control means responsive to said scanning means and the predetermined number of video fields per unit time for maintaining the video field patterns superimposed on each media frame equal in number;

d. counter means responsive to said scanning means for counting and maintaining a count of the number of video field superimposed on each media frame in response to the deflecting signal;

e. means for comparing the count maintained in said counter means to a predetermined number and for producing an inhibit signal when the count exceeds the predetermined number;

f. means for terminating the inhibit signal when said scanning means superimposes a video field pattern on a succeeding media frame in response to the deflecting signal; and g. inhibit means responsive to the inhibit signal for inhibiting the operation of said scanning means in response to said video information until said scanning means superimposes a video field pattern on a succeeding media frame.

3. Apparatus for recording video information derived from composite video field signals including horizontal synchronizing signals recurring at a frequency $F_h$, vertical synchronizing signals recurring at a field rate frequency $F_v$ and video information signals as pictorial information in media frames on photosensitive media continuously advanced through a media scanning zone at a frame rate frequency of $F_m$ media frames per second differing from the field rate frequency $F_v$, said apparatus comprising:

a. means for detecting the frame rate frequency of $F_m$ media frames per second and for producing a frame rate signal having a frame rate frequency $F_m$;

b. synchronizing means responsive to the frame rate signal and the vertical synchronizing signal for producing a vertical scan modification signal representative of the instantaneous position of $F_m/N$ media frames continuously advancing through said media scanning zone, where N is an integer equal to the highest common mathematical divisor of both $F_v$ and $F_m$;

c. scanning means responsive to the video information signal for generating a beam of radiation modulated in intensity thereby;

d. deflecting means responsive to the horizontal and vertical synchronizing signals for deflecting said modulated beam of radiation in a video field pattern of radiation recurring at the field rate $F_v$ and responsive to the vertical scan modification signal for superimposing $F_v/N$ video fields on $F_m/N$ media frames continuously advanced through said media scanning zone;

e. exposure control means responsive to the frame rate signal and the vertical synchronizing signal for maintaining the successive exposures of each media frame equal in number to the integer in the quotient of $F_v/F_m$ video field patterns superimposed on each media frame;

f. counter means for counting and maintaining a count of the number of video field patterns superimposed on each media frame and for resetting the count of said counter means to zero at each occurrence of a frame rate signal;

g. means responsive to said counter means for producing an inhibit signal when the count exceeds $F_m/N$;

h. means for terminating the inhibit signal when the circuit means superimposes a video field pattern on a succeeding media frame; and i. means responsive to the inhibit signal for inhibiting the operation of said scanning means in response to said video information until the inhibit signal is terminated.

4. The apparatus of claim 3 wherein said photosensitive media comprises unexposed photosensitive color motion picture film, the video information signals further comprise chrominance and luminance signals and said scanning means comprises color scanning means for exposing said media frames to video field patterns modulated by the chrominance and luminance signals.

5. The apparatus of claim 3 further comprising video reproduction apparatus for deriving the composite video field signals from pictorial information in media frames on radiation transmissive information bearing media, wherein said information bearing media is continuously advanced by said advancing means through said media scanning zone at the frame rate frequency $F_m$ and the media frames are scanned by said scanning means under the control of said deflecting means and said synchronizing means, said video reproduction apparatus further comprising:

a. means for maintaining the beam of radiation generated by said scanning means at a constant intensity as it scans the media frames of said information bearing media, whereby said beam of radiation transmitted by the media frames is modulated in intensity by the pictorial information on said media frames;

b. means for providing and applying horizontal synchronizing signals, recurring at the frequency $F_h$, and vertical synchronizing signals, recurring at the frequency $F_v$, to said deflecting means and said synchronizing means to control the production of video fields and the synchronization of the video field on the continuously moving media frames;

c. optical-to-electrical signal transducer apparatus responsive to the beam of radiation modulated in intensity by the pictorial information on said media frames for producing video field luminance and chrominance signals in response to each scanned media frame; and d. means for preventing the operation of said exposure control means, whereby each video field pattern is superimposed on a media frame during the video reproduction of the pictorial information on the information bearing media.

6. The apparatus of claim 3 wherein $F_v = 60$ fields per second, $F_m = 24$ frames per second and $N = 12$; and wherein said producing means produces an inhibit signal when the count exceeds $F_m/N = 24/12 = 2$, whereby each media frame moving at 24 frames per second is exposed to two superimposed video fields, and exposure of the media frames to at least one out of every successive video fields is prevented by the inhibition of said scanning means.

7. The apparatus of claim 3 wherein $F_v = 60$ fields per second, $F_m = 18$ frames per second and $N = 6$; and wherein said producing means produces an inhibit signal when the count exceeds $F_m/N = 18/6 = 3$, whereby each media frame on said photosensitive media moving at 18 frames per second is exposed to three superimposed video field patterns, and exposure of the media frames to at least one out of every 10 successive video field patterns is prevented by the inhibition of said scanning means.

8. The apparatus of claim 3 including reset means responsive to each occurrence of a frame rate signal recurring at the frequency $F_m$ for resetting the count of said counter means to zero.

9. A method of recording video information derived from composite video field signals including horizontal synchronizing signals recurring at a frequency $F_h$, vertical synchronizing signals recurring at a video field rate frequency $F_v$, and video information signals as pictorial information in media frames on photosensitive media continuously advanced through a media scanning zone at a frame rate of $F_m$ media frames per second differing from the field rate frequency $F_v$, said method comprising the steps of:

a. detecting the frame rate of $F_m$ media frames per second and producing a corresponding frame rate signal having a frequency $F_m$;

b. directing a beam of radiation modulated in intensity by the video information signal along a predetermined path to expose said media frame advanced through said media scanning zone;

c. deflecting said modulated beam of radiation in video field patterns of radiation recurring at the field rate frequency $F_v$ in response to the horizontal and vertical synchronizing signal;

d. counting the number of vertical synchronizing signals recurring at the field rate frequency $F_v$;

e. resetting the count of the field rate signals to zero at each occurrence of the frame rate signal; and f. superimposing a counted number of video fields equal in number to the integer inn the quotient of $F_v/F_m$ video fields on each media frame.

10. The method of claim 9 wherein the final step of superimposing an equal number of video fields on each media frame further comprises the steps of:

a. deflecting the video fields in synchronism with the frame rate $F_m$ of the media frames to superimpose Fv/N video fields on $F_m/N$ media frames continuously advanced through said media scanning zone wherein N is equal to the highest common integral mathematical divisor of both $F_m$ and $F_v$; and b. reducing the intensity of the beam of radiation to zero for the time period that the counted number of video fields exceeds the integer in the quotient $F_v/F_m$.

* * * * *